United States Patent
Lang et al.

(10) Patent No.: US 9,736,988 B2
(45) Date of Patent: Aug. 22, 2017

(54) BALER PLUNGER-POSITION SENSOR ASSEMBLY AND METHOD

(71) Applicant: DEERE & COMPANY, Moline, IL (US)

(72) Inventors: Eric R. Lang, Newhall, IA (US); Darin L. Roth, Batavia, IA (US)

(73) Assignee: DEERE & COMPANY, Moline, IL (US)

(*) Notice: Subject to any disclaimer, the term of this patent is extended or adjusted under 35 U.S.C. 154(b) by 877 days.

(21) Appl. No.: 14/168,343

(22) Filed: Jan. 30, 2014

(65) Prior Publication Data
US 2015/0208586 A1 Jul. 30, 2015

(51) Int. Cl.
*A01F 15/08* (2006.01)
*B30B 13/00* (2006.01)
*A01F 15/04* (2006.01)
*B30B 9/30* (2006.01)

(52) U.S. Cl.
CPC .......... *A01F 15/0825* (2013.01); *A01F 15/04* (2013.01); *A01F 15/042* (2013.01); *A01F 15/044* (2013.01); *A01F 15/046* (2013.01); *A01F 15/0841* (2013.01); *B30B 9/305* (2013.01); *B30B 9/3007* (2013.01); *B30B 13/00* (2013.01)

(58) Field of Classification Search
CPC ....... B30B 9/305; B30B 9/3007; B30B 13/00; A01F 15/04; A01F 15/042; A01F 15/044; A01F 15/046; A01F 15/0841; A01F 15/0825

USPC .................................. 100/35, 48, 49, 179
See application file for complete search history.

(56) References Cited

U.S. PATENT DOCUMENTS

| | | | |
|---|---|---|---|
| 5,123,338 A | 6/1992 | Mathis | |
| 6,161,368 A | 12/2000 | Wilkens et al. | |
| 6,257,131 B1 * | 7/2001 | Wilkens | A01F 15/0825 100/192 |
| 8,127,670 B2 * | 3/2012 | Vu | A01F 15/0841 100/179 |
| 2005/0056165 A1 | 3/2005 | Roth | |

FOREIGN PATENT DOCUMENTS

| | | |
|---|---|---|
| DE | 9108469 U1 | 9/1991 |
| EP | 0223351 A1 | 5/1987 |
| EP | 0655190 A2 | 5/1995 |
| WO | 2013045105 A1 | 4/2013 |
| WO | 2013135794 A1 | 9/2013 |

OTHER PUBLICATIONS

John Deere 1400 Series Large Square Balers, Nov. 2010.
European Search Report issued in counterpart application No. 15152073.1, dated Jun. 2, 2015 (5 pages).

* cited by examiner

*Primary Examiner* — Jimmy T Nguyen (57) ABSTRACT

A sensor assembly and method is described for determining the position of a reciprocating plunger of a baler. A first sensor may detect at least one location of a crank arm driving the plunger as the crank arm rotates. A second sensor may detect a rotation of a crank gear that drives the rotation of the crank arm. A controller may determine a position of the reciprocating plunger relative to a baling chamber based upon, at least in part, the detected crank arm location and the detected rotation of the crank gear.

20 Claims, 6 Drawing Sheets

BALER PLUNGER-POSITION SENSOR ASSEMBLY AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural and other baling operations, including baling operations resulting in large rectangular bales.

BACKGROUND OF THE DISCLOSURE

In various agricultural and other settings, it may be useful to form bales of crop (and other) material. The formed bales may have various sizes and, in certain applications, may exhibit generally rectangular (or other) cross-sections. Various machines or mechanisms may be utilized to gather material (e.g., from a windrow along a field) and process it into bales. In order to create rectangular bales, for example, a square baler may travel along a windrow of cut crop material gathering the material into a generally rectangular baling chamber. A reciprocating plunger may compress the crop material into bales, which may be wrapped, tied, or otherwise processed before being ejected from the back of the baler. In such an operation, and others, various moving components of a baler may interoperate and interact in order to facilitate the transport of material from pick-up to the baling chamber, the compaction of the material within the baling chamber, and the ejection of the compacted material (i.e., of the finished bales) from the rear of the baler.

SUMMARY OF THE DISCLOSURE

A sensor assembly and computer-implemented method are disclosed for determining the position of a reciprocating plunger of a baler.

According to one aspect of the disclosure, a baler may be provided having a reciprocating plunger for compressing gathered material into bales within a baling chamber. The reciprocating plunger may be driven by a connecting rod connected to a crank arm, the crank arm being rotated around a crank arm axis by a crank gear. The crank gear may be a spur gear rotated by power from a power take-off interface with a tractor.

In certain embodiments, a first and a second sensor may be mounted to the baler in positions that are fixed relative to, respectively, the crank arm and the crank gear. The first sensor may detect at least one location of the crank arm as the crank arm rotates around the crank arm axis. The first sensor may detect a proximity of the crank arm to the first sensor, including through detecting passage of a leading or trailing edge of the crank arm through a first sensor sensing location. The second sensor may detect a rotation of the crank gear, including through detection of the passage of one or more teeth of the crank gear through a second sensor sensing location.

In certain embodiments, a controller (or other computing device) may determine a position of the reciprocating plunger based upon, at least in part, the detected crank arm location and the detected crank gear rotation. For example, the controller may determine a home position of the crank arm based upon data from the first sensor and may determine a degree of rotational travel of the crank gear based upon data from the second sensor. The controller may further determine a degree of rotational travel of the crank arm from the home position based upon the determined rotational travel of the crank gear and, based upon geometrical relationships between the crank arm and plunger, thereby determine a position of the plunger. The controller may further determine one or more operational timings for various components of the baler based upon the determine plunger position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed sensor assembly and computer-implemented method, as shown in the accompanying figures of the drawings described briefly above. Various modifications to the example embodiments may be contemplated by one of skill in the art, including implementation of the disclosed method as a special-purpose computing system employing one or more processor devices and memory architectures.

As noted above, it may be useful in various circumstances to gather loose material, such as cut crop material, into compacted bales. In certain embodiments, such material may be gathered and compacted into generally rectangular bales. This may be accomplished by way of various types of square balers. For example, in certain square balers, cut crop (or other) material may be gathered from windrows along a field and may be passed into a baling chamber. A reciprocating plunger may move axially along the baling chamber in order to compress the gathered material into bales of various size and density, depending on the configuration of the baler.

In this and other operations, it may be useful to determine the location of a reciprocating plunger with relative accuracy. For example, as a plunger of a square baler reciprocates along a baling chamber, it may interoperate with various other components including feeder forks (which may feed material into the baling chamber when the piston retracts), threading and tying assemblies (which may tie formed bales with twine or other material to hold them together), and so on. In order to ensure that the various interoperating components of a square baler execute their respective functionality effectively and without interference, it may be useful to know the location of the plunger at various points along its reciprocating path. The sensor assembly and associated method described herein may usefully address this and other needs.

In certain embodiments, a reciprocating plunger of a square (or other) baler may be driven by a gear box. For example, a crank gear within a gear box may cause one or more crank arms to rotate. The crank arm(s) may be attached to a plunger by way of one or more connecting arms, such that as the crank arm(s) rotate the plunger is caused to move cyclically along a path. For example, as the crank arm(s) rotate, they may cause a plunger to move axially within a baling chamber between a retracted or "home" position, in which the plunger has moved to create maximal space in the baling chamber (i.e., is in a position that is maximally retracted from, or minimally extended into, the baling chamber, with respect to the operational path of travel of the plunger), and a position of maximal compression, which may be opposite the home position. (It will be understood that the "home" position of the plunger, where the plunger is driven by a crank arm, may also correspond to a "home" position of the crank arm (i.e., a position of the crank arm corresponding to the plunger being maximally retracted from the baling chamber).) In this way, by supplying rotational power to the gear box, reciprocating motion may be imparted to the piston to compress crop material within the baling chamber, with crop material within the baling chamber being generally compressed (and pushed toward the back of the baling chamber) as the piston moves from home to the position of maximal compression.

In order to provide a relatively accurate measure of the position of the plunger within the baling chamber, a sensor assembly may be provided. For example, a first sensor may be located adjacent to a crank arm, such that the sensor detects passage of the crank arm past the sensor (e.g., identifies a leading or trailing edge of the crank arm) as the crank arm rotates. A second sensor may be located adjacent to a gear of the gear box, such that the sensor detects rotation of the gear. A signal representing the reading of each sensor (e.g., a signal representing the passage of the crank arm, and a signal representing rotation of the gear) may be provided to a general or special computing device, such as a controller carried in the baler. The controller may then process the data from both sensors in order to determine the position of the plunger within the baling chamber. For example, if the first sensor detects passage of the crank arm when the plunger is at the home position, the controller may translate the sensed rotation of the gear into movement of the plunger (i.e., using known geometrical relationships) and add that movement to the home position to determine the current location of the plunger. In this way, even with relatively inexpensive sensors, plunger position may be determined along the entire path of the plunger with relatively high accuracy. Further, once this plunger position has been determined, the controller may utilize the plunger position in order to determine various operational timings for the baler. For example, using the determined plunger position, the controller may assess whether various components such as feeding forks, tying needles, retaining tines, and so on are appropriately synchronized with the plunger.

Figure 1:
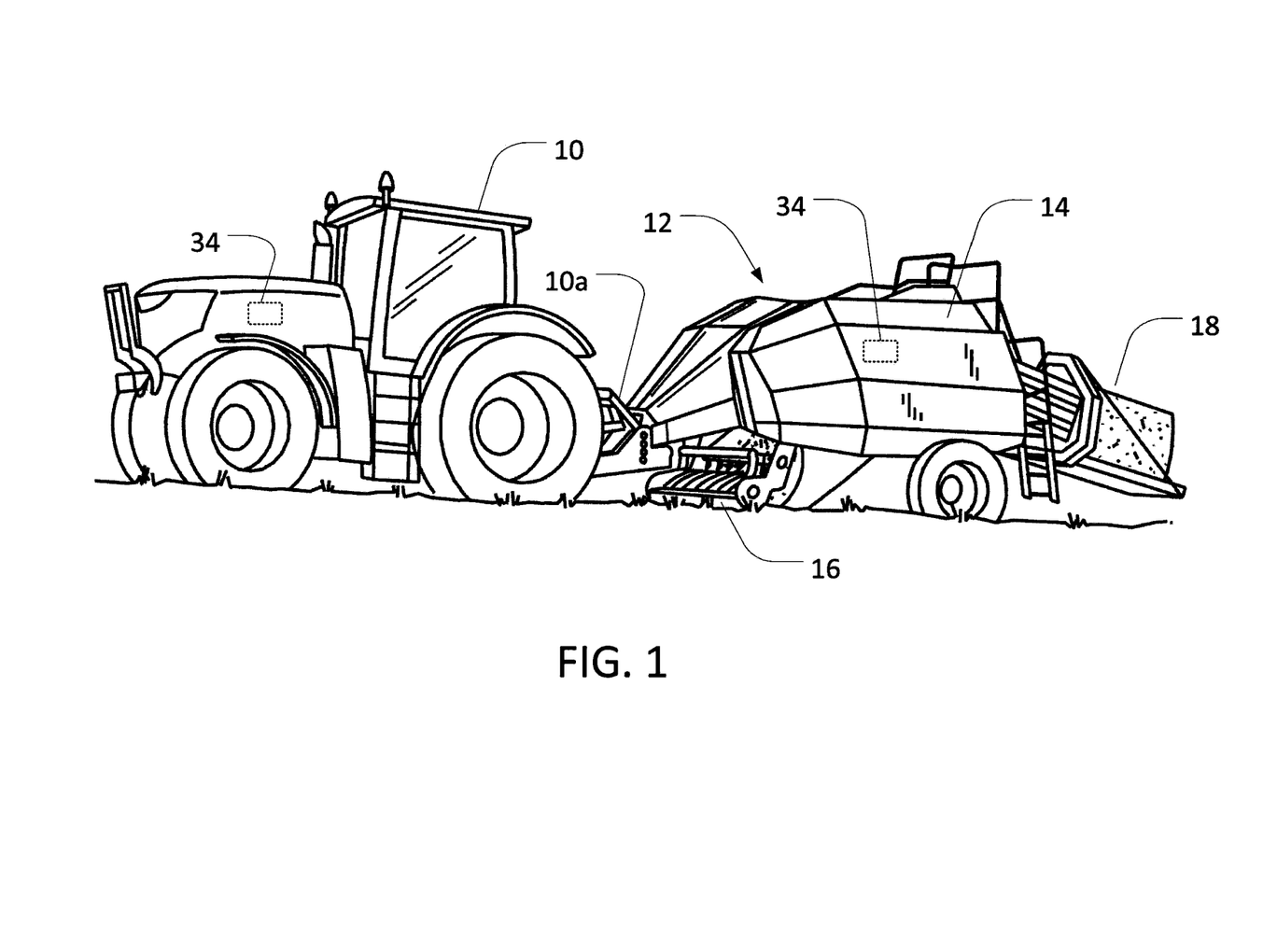
FIG. 1 is a perspective view of an example baler towed by an agricultural vehicle.

Referring now to FIG. 1, large square baler 12 may be towed across a field by agricultural vehicle 10. (It will be understood that various other configurations are also possible, For example, the disclosed sensor assembly and method may be utilized with a variety of balers or other equipment.) Baler 12 may include housing 14, which may generally shield various internal components of baler 12. As baler 12 moves across a field (e.g., as towed by vehicle 10 via connection 10a) and encounters a windrow or other arrangement of material (not shown), pick-up assembly 16 may gather the material and move it up and into housing 14 for processing. As a result of this processing, as described in greater detail below, bale 18 may be formed and may be ejected from the rear of baler 12.

In various embodiments, baler 12 (or vehicle 10) may include one or more computing devices, such as controller 34. Various alternative locations for controller 34 are depicted in FIG. 1, including locations on vehicle 10 and baler 12. It will be understood that one or more controllers 34 may be employed and that controller 34 may be mounted at various locations on vehicle 10, baler 12, or elsewhere. Controller 34 may be a hardware, software, or hardware and software computing device, and may be configured to execute various computational and control functionality with respect to baler 12 (or vehicle 10). As such, controller 34 may be in electronic or other communication with various components and devices of baler 12 (or vehicle 10). For example, controller 34 within baler 12 may be in electronic communication with various actuators, sensors, and other devices within (or outside of) baler 12. Controller 34 may communicate with various other components (including other controllers) in various known ways, including wirelessly.

Figure 2:
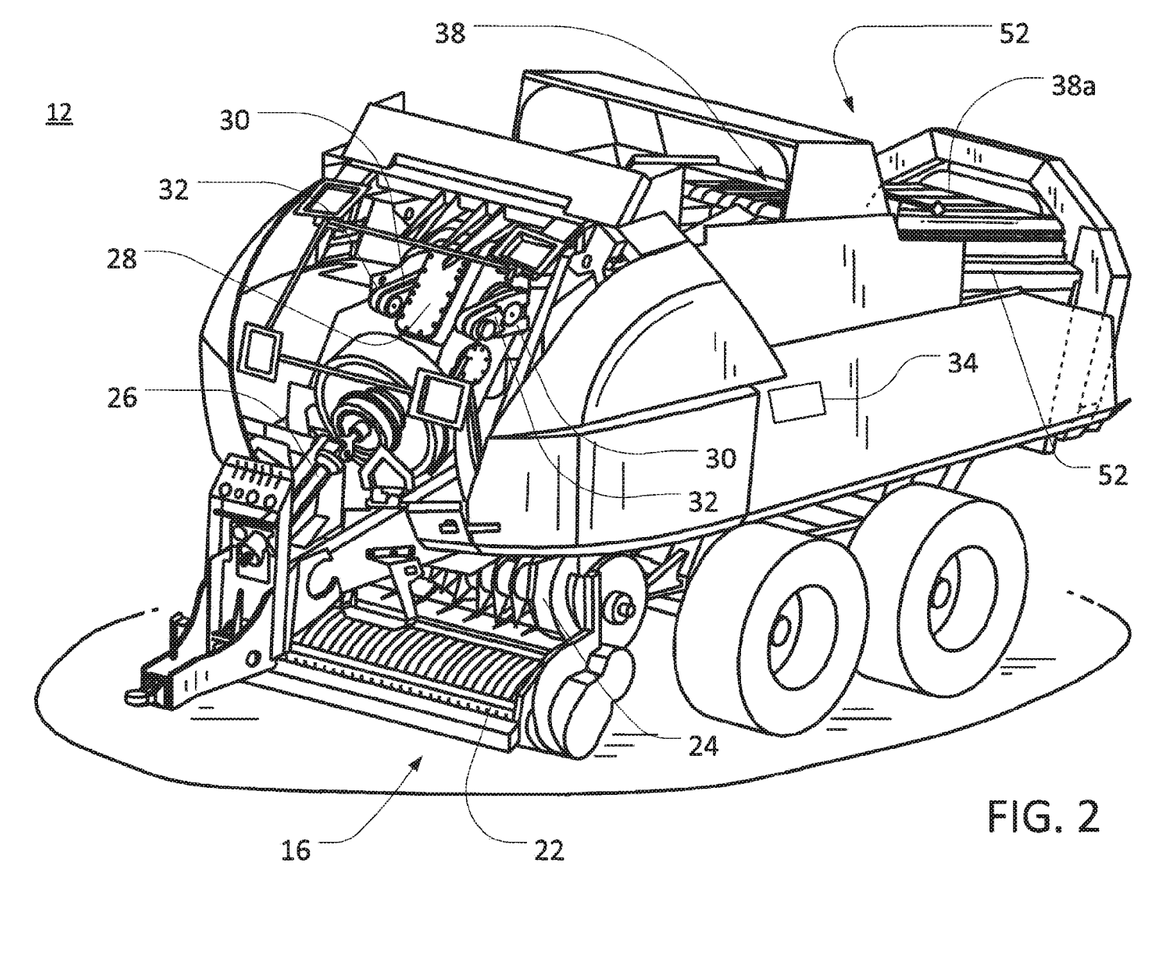
FIG. 2 is a perspective view of the baler of FIG. 1, with portions of the cover of the baler removed.

Referring now also to FIG. 2, various internal components of an example configuration of baler 12 are depicted. It will be understood that various other configurations may also be possible. Pick-up assembly 16, for example, may include rotary tine pick-up 22 for gathering crop material from windrow (not shown). Material gathered by rotary tine pick-up 22 may be routed to feed auger 24, which may further direct the material toward baling chamber 38 for compaction into a baler.

Baling chamber 38, which is depicted with upper panel 38a in place, may be a chamber of generally rectangular cross section extending axially along baler 12 in a generally front-to-back direction. Chamber 38 may be configured in various ways to receive material gathered by pick-up assembly 16, hold the material for compaction, then release the resulting bale from the back (or other portion) of baler 12 (e.g., as depicted for bale 18, in FIG. 1).

Baling chamber 38 may be bounded on one or more sides (e.g., to the right and left, from the perspective of the forward direction of baler 12) by tension panels 52, which may be movable in order to control various aspects of a baling operation. For example, various actuators (not shown) may be mounted to baler 12 and one or more of tension panels 52 such that the actuators may cause tension panels 52 to vary the cross-sectional area of baling chamber 38. In certain embodiments, for example, hydraulic pistons (not shown) may be configured to pivot tension panels 52 into (or out of) baling chamber 38, in order to decrease (or increase) the cross-sectional area of chamber 38 and thereby increase (or decrease) the force required to push a given amount of compacted crop material through chamber 38 (e.g., the pressure required for plunger 54 (see FIGS. 3A-C) to move the bale through chamber 38). In this way, for example, tension panels 52 may be utilized to vary the density of the resulting bale 18.

Compaction of crop material within baling chamber 38 may be driven in various ways. For example, as depicted in the various figures, plunger 54 (not shown in FIG. 2) may be driven by a crank arm assembly. As depicted in FIG. 2, power take off ("PTO") connection shaft 26 may be configured to receive rotational power from PTO shaft of vehicle 10 (e.g., via connection 10a, as shown in FIG. 1). In certain embodiments, accordingly, whenever the PTO output of vehicle 10 is engaged, PTO connection shaft 26 may be receiving rotational power from vehicle 10. (It will be understood that various other configurations are also possible, such as configurations in which shaft 26 (or various other components of baler 12) may be selectively disengaged even if the PTO output of vehicle 10 is engaged.)

In various embodiments, PTO connection shaft 26 may provide rotational power to gear box 28. Through one or more internal gears (not shown in FIG. 2), this power may be routed through gear box 28 to crank arms 30, which may be connected to plunger 54 (see FIGS. 3A-C) via connecting rod(s) 32. (Connecting rods 32 have been partially removed in FIG. 2, for clarity of presentation.) In this way, rotational power may be provided from vehicle 10 to crank arms 30. Crank arms 30, accordingly, may then drive the reciprocating motion of plunger 54 (see FIGS. 3A-C), via connecting rod(s) 32, in order to compact material within baling chamber 38 into formed bales 18. It will be understood that various other configurations may be possible. For example, in certain embodiments, gear box 28 may be powered by an electrical or hydraulic machine rather than by direct mechanical power from a PTO interface.

In various embodiments, rotation of PTO connection shaft 26 (e.g., as powered by the PTO output of vehicle 10) may additionally (or alternatively) provide rotational power to various components of baler 12. For example, the motion of various components of pick-up assembly 16, various tying mechanisms (not shown), pumps for hydraulic actuation of tension panels 38 (not shown), and so on, may be driven via power connections of various known types (e.g., chain or belt drives) to PTO connection shaft 26 or associated components.

Figure 3A:
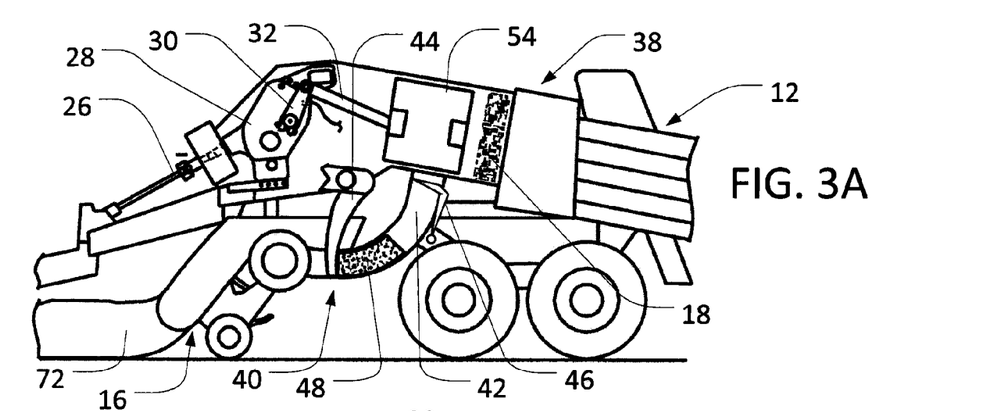
FIGS. 3A-3C are schematic views of aspects of the operation of the baler of FIG. 1.
Figure 3B:
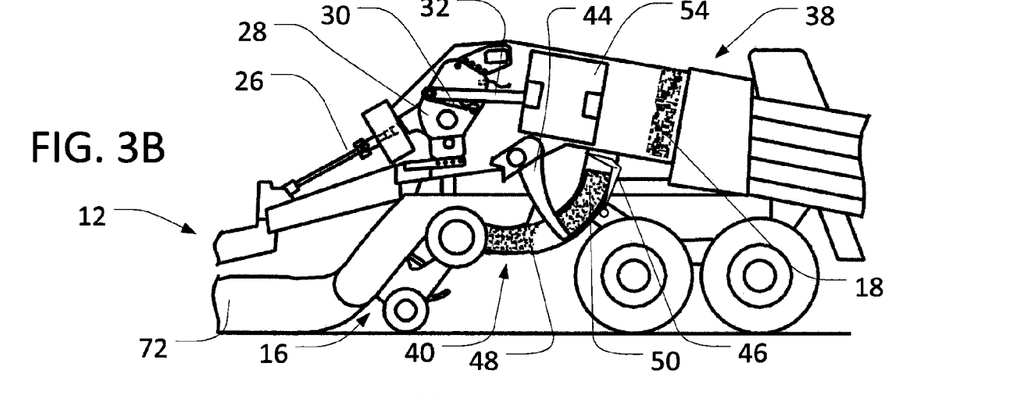
Figure 3C:
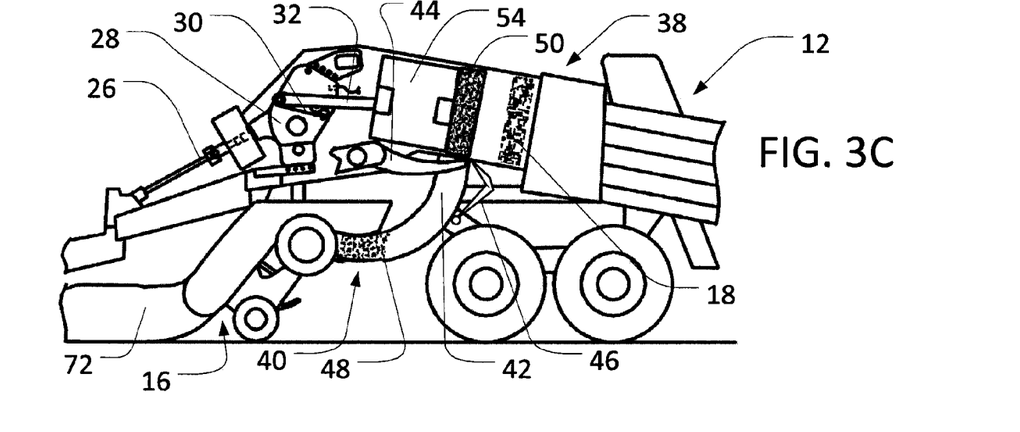

Referring also to FIGS. 3A-C, an example movement of material through baler 12, from a windrow to a formed bale, is depicted in a simplified schematic view of baler 12. Crop (or other) material may be gathered from windrow 72 by pick-up assembly 16 (e.g., picked up by rotary tine pick-up 22) and routed by assembly 16 (e.g., by feed auger 24) into feeder duct 40. Depending on the configuration of windrow 72, such gathering and routing may be relatively continuous as baler 12 moves along windrow 72. Crop (or other) material 48 within feeder duct 40 may be moved by various mechanisms (e.g., feeder forks 44 or a separate packer assembly (not shown)) along feeder duct 40 towards baling chamber 38. In certain embodiments, material 48 may not be fed continuously into baling chamber 38, but may be held within pre-charge chamber 42 of feeder duct 40 by retaining assembly 46 (e.g., one or more retaining tines (not shown)). As feeder forks 44 (or components of a different packer assembly) continue to move material along feeder duct 40, and the material continues to be prevented from entering baling chamber 38 (e.g., by retaining assembly 46), the material may begin to form an elongated "flake" within pre-charge chamber 42 (see FIG. 3B).

Once flake 50 of appropriate size has been formed (e.g., as determined by a flake density sensor (not shown)), flake 50 may be released by retaining assembly 46 and moved into baling chamber 37 by feeder forks 44 (see FIG. 3C). As depicted in FIG. 3C in particular, the timing of this release and movement of flake 50 into baling chamber 38 may be appropriately synchronized with the motion of plunger 54. For example, it may be appropriate to configure retaining assembly 46 to release flake 50, and feeder forks 44 to move flake 50 into baling chamber 38, only when plunger 54 has reached its home position (i.e., a position that is maximally retracted from, or minimally extended into, baling chamber 38, with respect to the operational path of travel of plunger 54, as depicted in FIG. 3C). In this way, for example, flake 50 may not be moved into baling chamber 38 until plunger 54 has pushed preceding crop material toward the back of chamber 38, then itself been retracted out of the way of flake 50.

It will be understood that various configurations may be possible. For example, although feeder forks 44 may be depicted as moving crop material 48 both along feeder duct 40 and into baling chamber 38, two or more separate mechanisms may address these respective material movements. For example, a packer assembly (not shown) may transport material 48 along feeder duct 40 and a separate feeder assembly (not shown) may transport flake 50 from pre-charge chamber 42 into baling chamber 38. In certain embodiments, flake 50 may be formed elsewhere than in pre-charge chamber 42 or may be fed into baling chamber 38 from the side of baling chamber 38, rather than the bottom. Further, in various embodiments, various components of baler 12 may be mechanically, electrically, hydraulically or otherwise actuated. In this light, it will be understood that the timing of the operation of the various components may be controlled mechanically (e.g., via various geared or other relationships), or one or more sensors (not shown) or controllers (e.g., controllers 34) may be included to measure or coordinate movement of various components.

Once bale 18 has been formed, it may be tied in order to assist bale 18 in retaining its shape once it has been ejected from baling chamber 38. As such, various tying mechanisms (not shown) may be included for looping, wrapping, and tying twine or other material around bale 18. For example, various tying needles, knotter assemblies, and so on (not shown) may be included. As noted above, these mechanisms and their components may be actuated and controlled in various ways.

Figure 4:
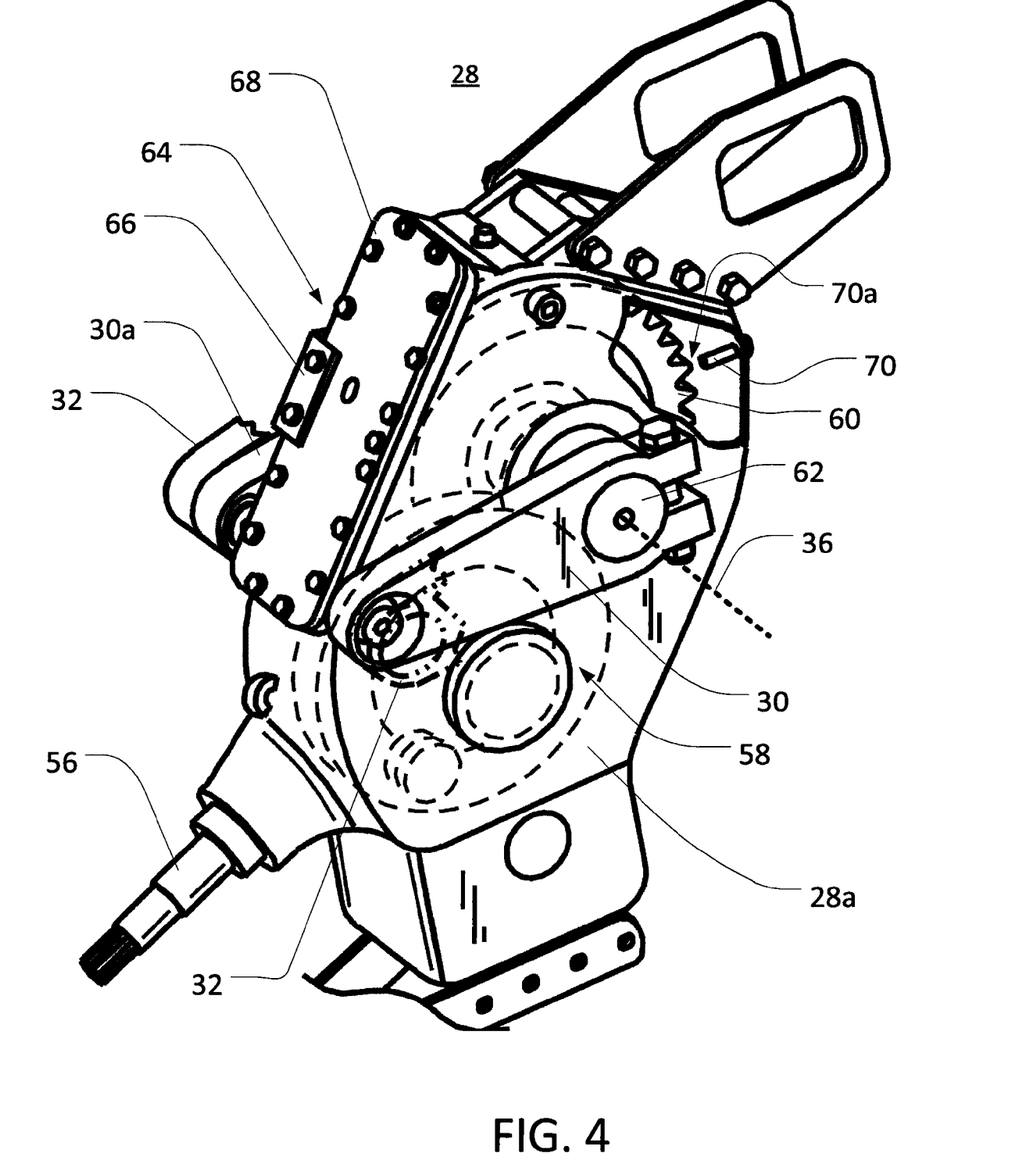
FIG. 4 is a perspective view of one configuration of a gear box and associated components included in the baler of FIG. 1.
Figure 5:
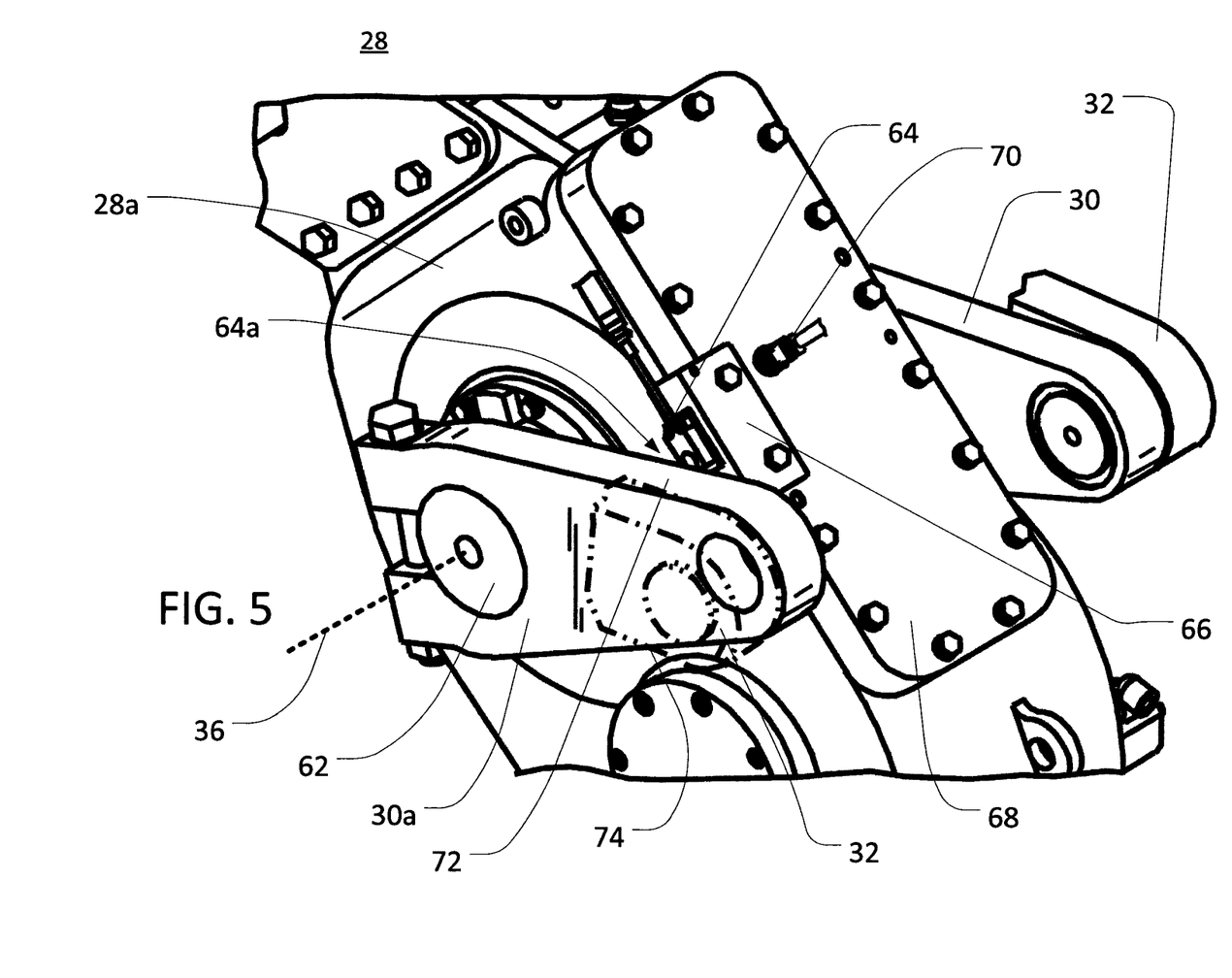
FIG. 5 is a partial perspective view of another configuration of the gear box of FIG. 4.

As also noted above, because of the complicated interactions of various components of baler 12, it may be useful to provide a sensor assembly (and related method) to accurately and, in certain embodiments, continuously monitor the position of plunger 54. Referring also to FIGS. 4 and 5, for example, an assembly of two or more sensors (or a single sensor configured to execute diverse sensing functionality) may be included in baler 12. As also discussed above, gear box 28 may receive rotational power (directly or indirectly) from PTO connection shaft 26 in various known ways. As depicted in FIG. 4, for example, gear box 28 may receive rotational power at input shaft 56. Through internal gearing 58 of various configurations (e.g., for reduction of rotational speed from shaft 26 to ensure appropriately timed movement of plunger 54), this input power may drive the rotation of bull gear 60. Bull gear 60 may in turn drive the rotation of crank arms 30 around crank arm axis 36. For example, crank arms 30 may be secured by a splined connection to stub shafts 62 extending from bull gear 60 out of gear box 28. In this way, for example, rotational power from PTO connection shaft 26 (or another source) may be utilized to drive rotation of crank arms 30 and, thereby, the reciprocating motion of plunger 54.

As depicted in FIGS. 4 and 5, a set of two sensors may be mounted to housing 28a of gear box 28 (or otherwise fixed with respect to various components of baler 12). For example, crank arm sensor 64 may be mounted to mounting bracket 66 (or another feature) on cover 68 of gear box 28. Crank arm sensor 64 may be a optical sensor, a Hall effect or other magnetic sensor, or a sensor of various other known configurations. Referring specifically to FIG. 5, crank arm sensor 64 may be located in relatively close proximity to crank arm 30a, such that sensor 64 may sense the passage of crank arm 30a past sensor 64 as crank arm 30a rotates around axis 36. For example, crank arm sensor 64 may be configured to provide a voltage signal that is higher when there is metal material present in sensing location 64a, and lower when no metal material is present in sensing location 64a. In this way, for example, sensor 64 may be configured to provide a voltage signal to controller 34 that will be high when a portion of crank arm 30a is in location 64a, but low when crank arm 30a is elsewhere. Controller 34 may accordingly be configured to identify the passage of the leading (or trailing) edge of crank arm 30a as it passes through location 64a by identifying the leading (or trailing) edge of the associated voltage spikes in the signal from sensor 64. Controller 34 may accordingly determine, with relatively high precision, the location of crank arm 30a at at least one point in the crank arms' revolution around axis 36. As depicted, sensor 64 may be mounted to cover 68 of gear box 28 (or other feature of baler 12) such that this determined location may correspond with the home position of plunger 54. It will be understood, however, that other configurations may also be possible, including configurations in which sensor 64 senses crank arm 30a when plunger 54 is at a different location.

Still referring to FIGS. 4 and 5, gear sensor 70 may be mounted to the housing of gear box 28 and may extend into the housing towards bull gear 60. Sensor 70 may be an optical sensor, a Hall effect or other magnetic sensor, or a sensor of various other configurations. For example, sensor 70 may be a magnetic sensor configured to identify the passage of individual teeth of gear 60 through sensing location 70a. Sensor 70 may be mounted to gear box 28 in relatively close proximity to bull gear 60, such that sensor 70 may sense the passage of the teeth (or other features) of bull gear 60 as gear 60 rotates within gear box 28. For example, gear sensor 70 may be configured to provide a voltage signal that is higher when there is metal material present in sensing location 70a, and lower when no metal material is present in sensing location 70a. In this way, for example, sensor 70 may be configured to provide a voltage signal to controller 34 that will be high when a tooth of gear 60 is in location 70a, but low when a tooth is not in location 70a. Controller 34 may accordingly be configured to identify the passage of individual teeth of gear 60 and, thereby, determine the degree of rotation of gear 60 with respect to a reference position. Various other configurations may also be possible.

Based upon data from sensors 64 and 70, and using known geometrical relationships of crank arms 30, connecting rod 32, and plunger 54, controller 34 may accordingly determine the position of plunger 54 with relatively high accuracy. As noted above, for example, a reference (e.g., home) location of crank arm 30a may be determined based upon data from crank arm sensor 64. From that time (and that location of plunger 54), controller 34 may then determine the degree of rotational travel of gear 60 based upon data from gear sensor 70 and, correspondingly, the degree of rotational travel of crank arm 30a away from the determined reference position. Based on the known geometrical relationships noted above, this degree of rotational travel of crank arm 30a may be determined to correspond to a distance of translational travel of plunger 54. Accordingly, using the known reference position (from sensor 64) and this distance of translational travel, the current position of plunger 54 may be determined.

Various other configurations may also be possible. For example, although controllers 34 may be depicted separately from sensors 64 and 70, in various embodiments a controller may be included in (or with) one or both of the sensors. As such, for example, sensor 64 may itself determine the reference location of crank arm 30 and sensor 70 may itself determine the degree of rotation of gear 60.

Similarly, it will be understood that sensors 64 and 70 may be mounted to various locations, with respect to gear box 28. For example, sensor 64 is depicted in FIGS. 4 and 5 as mounted to cover 68 in order to sense passage of trailing edge 72 of crank arm 30a when plunger 54 is at its home position. In certain embodiments, sensor 64 may be mounted to sense leading edge 74 of crank arm 30a when plunger 54 is at its home position, or to sense either of edges 72 or 74 at various other locations in the rotation of crank arm 30a around axis 36. Similarly, for example, sensor 70 is depicted in FIG. 4 as mounted to gear box 28 toward the rear of baler 12. In certain embodiments, sensor 70 may be mounted to gear box 28 in other locations, such on cover 68 (as depicted in FIG. 5). Further, it will be understood that gear sensor 70 need not necessarily detect rotation of a gear that directly drives crank arm 30a (i.e., gear 60 directly rotating stub shaft 62 to which crank arm 30a is mounted). For example, gear sensor 70 may be configured to detect rotation of various other gears within gear box 28 (or elsewhere in baler 12 or vehicle 10), with the degree of rotation of the sensed gear, in such a case, being modified appropriately to reflect the degree of rotation of crank arm 30a (e.g., modified with respect to the intervening gear ratio between the gear sensed by sensor 70 and crank arms 30). In this sense, gear sensor 70 may be generally viewed as sensing rotation of a "crank gear," which may be a gear that drives the rotation of crank arm 30a either directly (as with bull gear 60) or indirectly.

Figure 6:
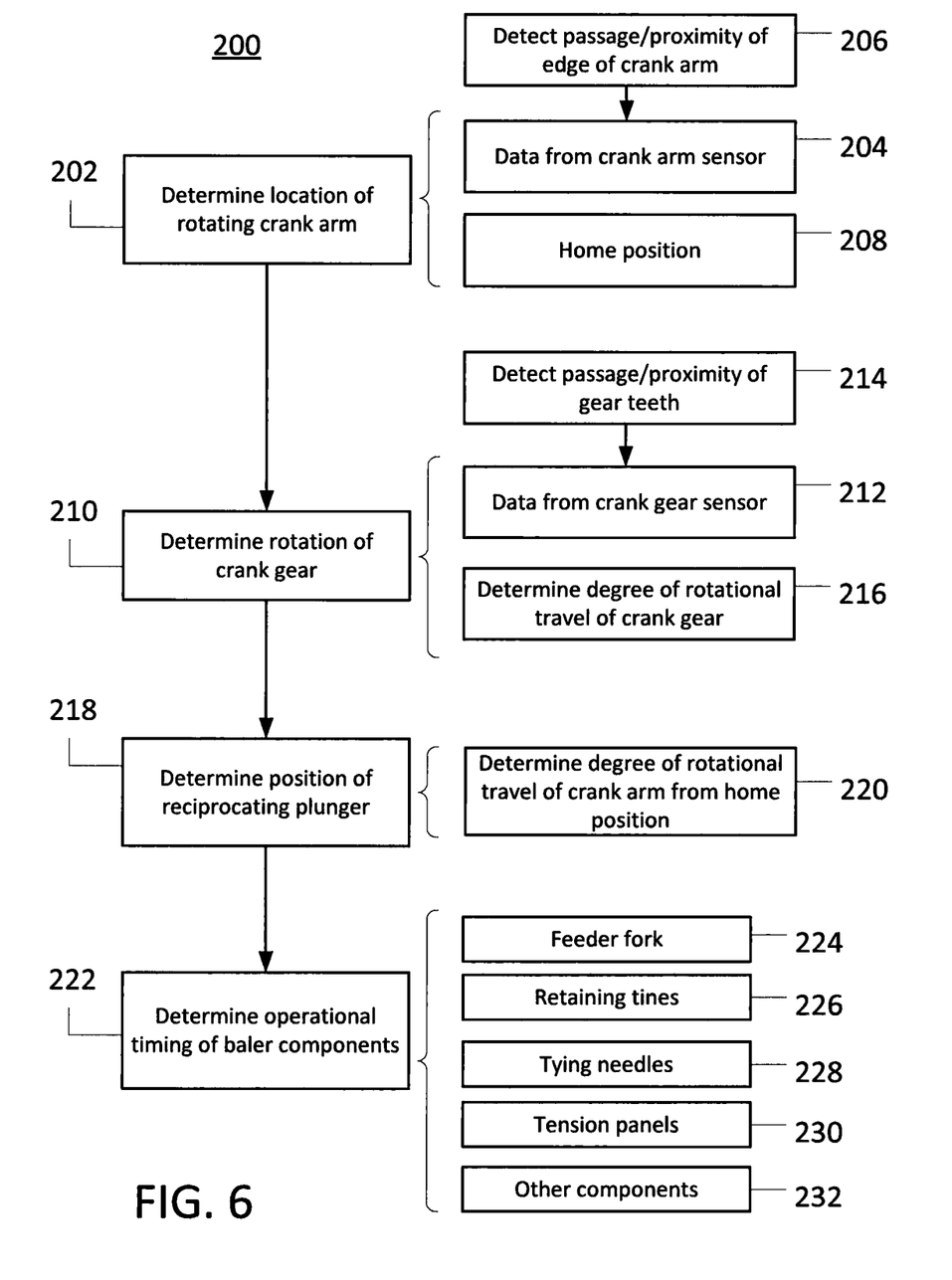
FIG. 6 is a diagrammatic view of a baling control method that may be implemented with respect to the baler of FIG. 1.

Referring also to FIG. 6, in light of the example system described above, controller 34 (or another device) may execute baling control method 200. Method 200 may include determining 202 the location of a rotating crank arm of a baler, based upon data 204 from a crank arm sensor. The crank arm sensor may determine data 204, for example, based upon detecting 206 the passage of a crank arm by (or proximity of a crank arm to) the crank arm sensor. In certain embodiments, as also described above, the detected 206 passage/proximity may correspond to home position 208 of a plunger of the baler.

Method 200 may further include determining 210 rotation of a crank gear. As also noted above, a crank gear may drive a crank arm directly (e.g., as with gear 60 in FIG. 4) or indirectly. Rotation of the crank gear may be determined 210 based upon data 212 from a crank gear sensor, which sensor may, for example, determine data 212 based upon detecting 214 passage of one or more gear teeth by (or proximity of one or more gear teeth to) the crank gear sensor. In certain embodiments, as also described above, determining 210 the rotation of the crank gear may include determining 216 a degree of rotational travel of the crank gear. For example, each gear passage that is detected 214 may be determined 216 to correspond to a particular angular rotation of the detected gear.

Method 200 may further include determining 218 a current position of a plunger of the baler. In certain embodiments, determining 218 the current plunger position may include determining 220 a degree of rotational travel of a crank arm that drives the plunger from a home position, which may correspond to the determined 202 home position 208 of the crank arm. As also described above, the determined 220 degree of rotational travel of the crank arm may correspond, based upon known geometrical relationships, to a distance of translational travel of the plunger, which may be driven by the crank arm. In certain embodiments, this distance of translational travel (which may include travel in both a compression and a retraction direction over a full cycle of plunger motion) may be added to the reference position of the plunger (i.e., as determined based upon the determined 202 crank arm location), in order to determine 218 the current plunger position.

Continuing, method 200 may further include determining 222 various operational timings of various baler components, based upon the determined 218 position of the reciprocating plunger. For example, as noted above, a plunger of a baler may interoperate with various other baler components and may sometimes move in close proximity to various other moving components. As such, it may be useful to compare the determined 218 position of the plunger with a determined (or expected) position of various other components in order to ensure that the plunger and the other components are operating with complementary timing (i.e., are synchronized in their movement so as to ensure optimal baler performance). For example, controller 34 may operate in conjunction with various other sensors (not shown) in baler 34 to determine the current (or expected) position of feeder fork 224, retaining tines 226, tying needles 228, or various other components 232. This determined position may be compared with the determined 218 plunger position, in order to determine 222, for example, whether the plunger and the other component(s) are operating with appropriately synchronized timing.

As noted above, in certain embodiments various components of a baler may be controllably actuated (e.g., actuated based upon a control signal issued by controller 34). In such a case, once an appropriate operational timing of various baler components has been determined 222, control signals to various components may be adjusted appropriately to ensure that the components are operating with the appropriate determined 222 timing. For example, controller 34 may determine 222 an appropriate timing for operation of feeder fork 224 based upon the determined 218 plunger position (e.g., a timing that ensures no contact between feeder fork 224 and the plunger), and may send a control signal to feeder fork 224 to control movement of feeder fork 224 accordingly. In certain embodiments, the determined 222 operational timing may not necessarily be used to actively control baler components. In this case, and others, however, the determined 222 timing may be utilized for diagnostic, maintenance, or other purposes. For example, during maintenance on a baler, the determined 218 plunger position may be assessed in order to determine 222 whether the plunger is operating in synchronized timing with various other baler components and, accordingly, to adjust the operational timing of the plunger or the other components as necessary.

In various embodiments, the determined 218 position of the reciprocating plunger (or various determined 222 operational timings) may also be utilized in conjunction with various other measurements, calculations, and parameters regarding a particular baler. In various embodiments, controller 34 may utilize the determined 218 plunger position in combination with torque measurements for the plunger and crank arm in order to control various aspects baler performance. For example, it will be understood that as a plunger begins to compress crop material within a baling chamber the pressure within the baling chamber (and, correspondingly, the torque on the crank arm driving the plunger) may increase. It may be useful to control actuation of tension panels 230 to appropriately manage this increase in pressure, including through PID or other control loops configured to maintain relatively constant pressure (and torque) throughout the compression stroke. In this control (e.g., with respect to the PID or other control loop), it may be useful to account for the relative location of the plunger within its compression (or other) stroke (e.g., so as not to overcompensate for an initial spike in pressure/torque at the start of the compression stroke, to account for changes in mechanical advantage at various angles of the crank arm, and so on).

As will be appreciated by one skilled in the art, various aspects of the disclosed subject matter may be embodied as a computer-implemented method, a system, or a computer program product. Accordingly, certain embodiments may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A sensor assembly for a baler, the baler having a reciprocating plunger for compressing gathered material into bales within a baling chamber, the reciprocating plunger being driven by a crank arm, the crank arm being rotated around a crank arm axis by a crank gear, the sensor assembly comprising:
    a first sensor detecting at least one location of the crank arm as the crank arm rotates around the crank arm axis; and
    a second sensor detecting a rotation of the crank gear; and
    a controller determining a position of the reciprocating plunger relative to the baling chamber based upon, at least in part, the detected at least one location of the crank arm by the first sensor and the detected rotation of the crank gear by the second sensor.

2. The sensor assembly of claim 1, wherein the first sensor detects a proximity of the crank arm to the first sensor.

3. The sensor assembly of claim 1, wherein the first sensor detects the at least one location of the crank arm by, at least in part, detecting passage of a trailing edge of the crank arm through a first sensor sensing location.

4. The sensor assembly of claim 1, wherein the first sensor detects the at least one location of the crank arm by, at least in part, detecting passage of a leading edge of the crank arm through a first sensor sensing location.

5. The sensor assembly of claim 1, wherein the at least one location of the crank arm detected by the first sensor corresponds to a minimum operational extension of the reciprocating plunger into the baling chamber.

6. The sensor assembly of claim 1, wherein at least one of the first sensor and the second sensor is mounted to a housing of the crank gear in a position that is fixed relative to, respectively, the crank arm and the crank gear.

7. The sensor assembly of claim 1, wherein the second sensor detects rotation of the crank gear by, at least in part, detecting passage of one or more teeth of the crank gear through a second sensor sensing location.

8. The sensor assembly of claim 1, wherein the crank gear is a spur gear rotated by, at least in part, power from a power take-off interface with a tractor.

9. The sensor assembly of claim 1, wherein determining the position of the reciprocating plunger relative to the baling chamber is based upon, at least in part, the controller:
    determining a home position of the crank arm based upon, at least in part, the first sensor detecting the at least one location of the crank arm;
    determining a degree of rotational travel of the crank gear based upon, at least in part, the second sensor detecting the rotation of the crank gear; and
    determining a degree of rotational travel of the crank arm from the home position based upon, at least in part, the determined degree of rotational travel of the crank gear.

10. The sensor assembly of claim 1, wherein the controller is further configured to:
    determine an operational timing for one or more components of the baler other than the crank arm and the reciprocating plunger based upon, at least in part, the determined position of the reciprocating plunger relative to the baling chamber.

11. A computer-implemented method of controlling a baling operation for a baler, the baler having a reciprocating plunger for compressing gathered material into bales within a baling chamber, the reciprocating plunger being driven by a crank arm, the crank arm being rotated around a crank arm axis by a crank gear, the method comprising:

determining, by one or more computing devices, at least one location of the crank arm as the crank arm rotates around the crank arm axis based upon, at least in part, data from a crank arm sensor;

determining, by the one or more computing devices, a rotation of the crank gear based upon, at least in part, a crank gear sensor; and determining, by the one or more computing devices, a position of the reciprocating plunger relative to the baling chamber based upon, at least in part, the determined at least one location of the crank arm and the determined rotation of the crank gear.

12. The computer-implemented method of claim 11, wherein the crank arm sensor detects a proximity of the crank arm to the crank arm sensor.

13. The computer-implemented method of claim 11, wherein the crank arm sensor data indicates, at least in part, the crank arm sensor detecting the at least one location of the crank arm by, at least in part, detecting passage of a trailing edge of the crank arm through a crank arm sensor sensing location.

14. The computer-implemented method of claim 11, wherein the crank arm sensor data indicates, at least in part, the crank arm sensor detecting the at least one location of the crank arm by, at least in part, detecting passage of a leading edge of the crank arm through a crank arm sensor sensing location.

15. The computer-implemented method of claim 11, wherein the at least one location of the crank arm corresponds to a minimum operational extension of the reciprocating plunger into the baling chamber.

16. The computer-implemented method of claim 11, wherein at least one of the crank arm sensor and the crank gear sensor is mounted to a housing of the crank gear in a position that is fixed relative to, respectively, the crank arm and the crank gear.

17. The computer-implemented method of claim 11, wherein the crank gear sensor data indicates, at least in part, the crank gear sensor detecting the rotation of the crank gear by, at least in part, detecting passage of one or more teeth of the crank gear through a crank gear sensor sensing location.

18. The computer-implemented method of claim 11, wherein the crank gear is a spur gear rotated by, at least in part, power from a power take-off interface with a tractor.

19. The computer-implemented method of claim 11, wherein determining the position of the reciprocating plunger relative to the baling chamber is based upon, at least in part:

determining a home position of the crank arm based upon, at least in part, the crank arm sensor data;

determining a degree of rotational travel of the crank gear based upon, at least in part, the crank gear sensor data; and determining a degree of rotational travel of the crank arm from the home position based upon, at least in part, the determined measure of rotational travel of the crank gear.

20. The computer-implemented method of claim 11, further comprising:

determining an operational timing for one or more components of the baler other than the crank arm and the reciprocating plunger based upon, at least in part, the determined position of the reciprocating plunger relative to the baling chamber.

* * * * *